Nov. 25, 1969    B. L. FISHBAUGH    3,480,268
SHOCK ABSORBER
Filed Dec. 26, 1967    4 Sheets-Sheet 1

INVENTOR.
BYRON L. FISHBAUGH
BY
ATTORNEY

Nov. 25, 1969  B. L. FISHBAUGH  3,480,268
SHOCK ABSORBER
Filed Dec. 26, 1967  4 Sheets-Sheet 2

INVENTOR.
BYRON L. FISHBAUGH
BY
ATTORNEY

Nov. 25, 1969  B. L. FISHBAUGH  3,480,268
SHOCK ABSORBER

Filed Dec. 26, 1967  4 Sheets-Sheet 3

INVENTOR.
BYRON L. FISHBAUGH
BY
ATTORNEY

Nov. 25, 1969        B. L. FISHBAUGH        3,480,268
                        SHOCK ABSORBER
Filed Dec. 26, 1967                        4 Sheets-Sheet 4

INVENTOR.
BYRON L. FISHBAUGH
BY
*P. Milliken*
ATTORNEY

United States Patent Office 3,480,268
Patented Nov. 25, 1969

3,480,268
SHOCK ABSORBER
Byron L. Fishbaugh, St. Marys, Ohio, assignor to The Goodyear Tire & Rubber Company, Akron, Ohio, a corporation of Ohio
Filed Dec. 26, 1967, Ser. No. 693,349
Int. Cl. F16f 1/38, 1/40
U.S. Cl. 267—1                                       13 Claims

ABSTRACT OF THE DISCLOSURE

A shock absorber for damping vibration such as may be encountered in railway draft gear rigging. It comprises a tubular housing and a tubular plunger which telescopes into the housing. Stacked elastomeric compression pads are positioned inside the plunger and housing to cushion relative axial movement of the housing and plunger due to axial loading. Elastomeric friction pads are mounted between the sidewalls of the housing and the plunger to provide additional vibration damping by exerting a drag on one of the sidewalls.

---

This invention relates to shock absorbers which may be used on railway draft gear rigging and in many other applications where shock absorption and vibration damping are required.

Description of the prior art

It is known in the prior art to use stacked elastomeric pads in various shapes and arrangements as a cushioning or spring means in shock absorbers. It is also known to wedge friction shoes against a sidewall of a shock absorber to assist other cushioning members in absorbing impacts. The closest prior art to this invention known by the applicant are United States Patent No. 2,639,004 issued to H. W. Mulcahy, United States Patent No. 2,914,196 issued to W. E. Withall, and Canadian Patent No. 519,241 issued to D. Willison.

The Mulcahy patent discloses the use of stacked elastomeric blocks centrally located within a shock absorber housing and metal spacers between each elastomeric block. Also disclosed in the Mulcahy patent is the use of friction shoes wedged against a sidewall of the housing to assist in absorbing the initial impact on the shock absorber.

The Withall patent shows the use of elastomeric pads some of which operate in shear and some operate under compression to absorb shocks in a railway draft rigging.

The Willison patent shows a particular configuration of elastomeric cushioning pads having a metal stiffener plate.

One of the primary difficulties encountered in the prior art is to obtain a proper combination of compression pads or springs that will operate most effectively in conjunction with some type of friction drag member without one of such components resisting or overpowering the action of the other component. In other words, the problem involved is to obtain cooperation between the friction element and the compression element with each one performing a given function and assisting the other component without opposing the operation of the other component.

Objects of the invention

It is a primary object of this invention to provide a shock absorber in which the friction members and the compression members cooperate to provide shock absorption and vibration damping without one member retarding the operation of the other member.

Another object of this invention is to provide a shock absorber which is simple in construction thereby facilitating servicing and parts replacement.

Still another object of this invention is to provide a shock absorber in which the moving parts create a seal to prevent dust, water and other foreign matter from entering the interior thereof and interfering with the efficient operation of the device.

These and other objects of the invention will become apparent in the following specification and in the attached drawings.

Description of the preferred embodiments

Figure 1:
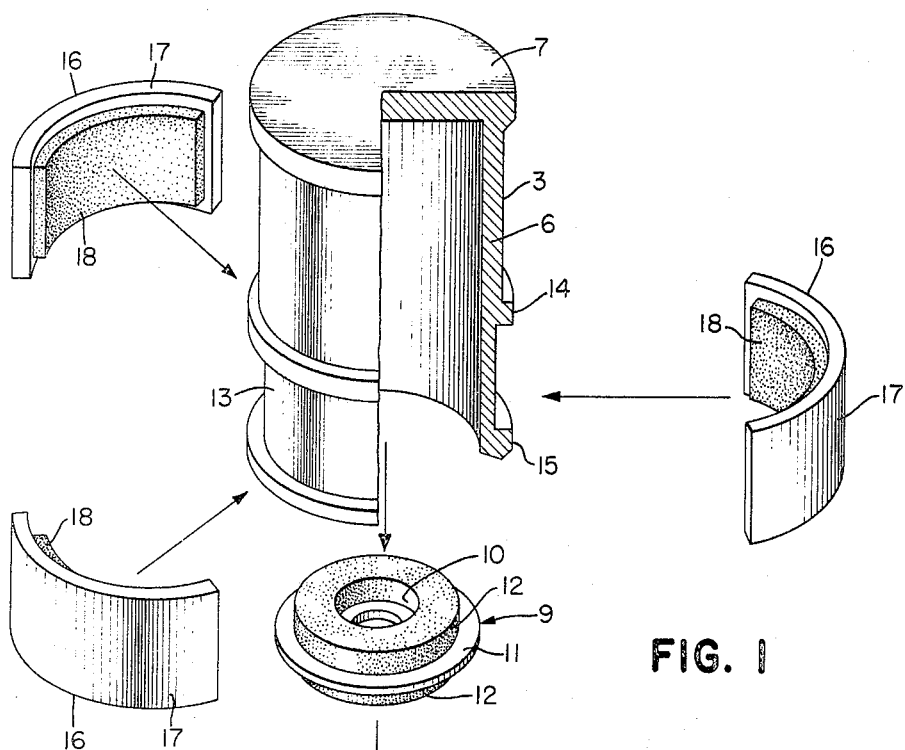
FIG. 1 is an exploded perspective view of a preferred embodiment of the invention with portions broken away to show structural details of the parts.
Figure 2:
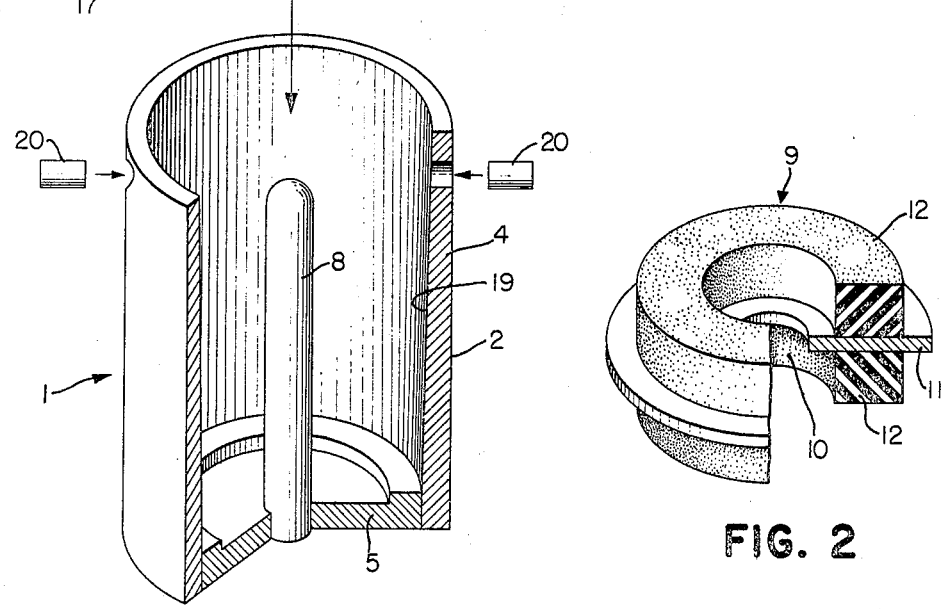
FIG. 2 is an enlarged perspective view of one of the compression pads used in the assembly shown in FIG. 1 with a portion of the compression pad broken away to show the cross-sectional structure.

Referring now to FIG. 1 of the drawings, a shock absorber indicated generally by the numeral 1 is formed primarily of a tubular housing 2 and a tubular plunger 3 which is telescopically received by the housing 2. The term "tubular" as used herein is not necessarily limited to mean members of cylindrical cross section but is defined as any hollow elongated member which may be round, square, hexagonal or of any other suitable cross-sectional contour. The housing 2 has a substantially cylindrical sidewall 4 and an end wall 5 in one end of the housing with the opposite end being open. The plunger 3 has a substantially cylindrical sidewall 6 and an end wall 7 closing one end of the plunger 3 with the opposite end remaining open. The housing 2 has a center guide pin 8 which has one end fastened to the end wall 5 and extends centrally of the housing 2 with the opposite end being a free end located near the open end of the housing 2. A plurality of compression pads 9 having a central opening 10 therethrough are stacked on the guide pin 8 which passes through the opening 10 of each compression pad 9 and provides a sliding fit therewith. The structural details of the compression pad 9 are shown in FIG. 2 wherein a circular stiffening plate 11 has a rubber cushioning block or ring 12 adhered to each side of the plate 11. The inside and outside diameter of the cushioning ring 12 is such that its edges terminate short of the inside and outside edges of the plate 11. The proportions of the ring 12 in relation to the plate 11 are designed to provide for radial expansion of the ring 12 inside the plunger 3 when a compression load is applied to the compression pad 9 as will be explained hereafter in greater detail. Near the open end of the plunger 3, a recessed annular channel 13 is provided in the outer surface of the sidewall 6 between circular ribs 14 and 15. The channel 13 is designed to receive three friction pads 16, each of which has a friction shoe 17 bonded to an elastomeric block 18 with the edges of the block 18 terminating short of the edges of the friction shoe 17 to provide for edgewise expansion of the block 18 when it is subjected to compression. Although three friction pads 16 are shown for the purpose of illustrating the invention, it is obvious that any number of pads may be used depending upon the size of the shock absorber and the particular functional requirements of each specific situation.

Figure 3:
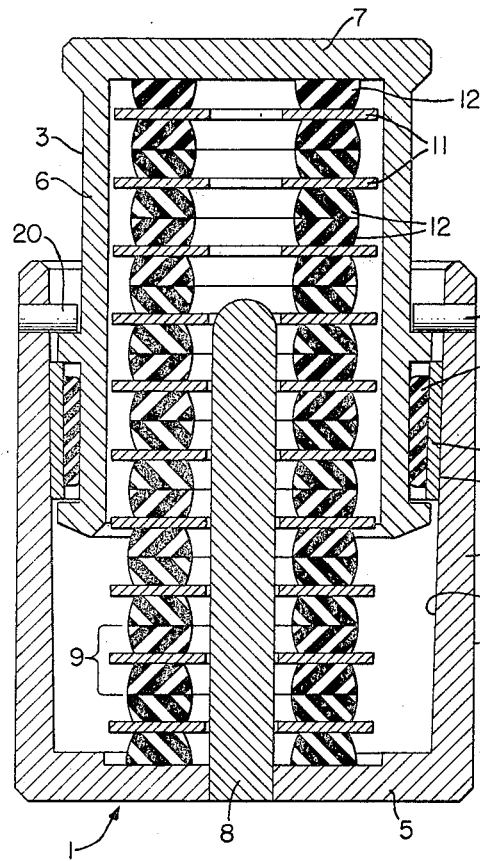
FIG. 3 shows a cross-sectional view of the shock absorber shown in FIG. 1 with the plunger in the unloaded position.

To understand the assembly of the various parts of the shock absorber, reference should be had to FIGS. 1 and 3 with FIG. 1 showing the individual parts before assembly and FIG. 3 showing all the parts assembled in operative position. In assembling the shock absorber 1, a plurality of compression pads 9 are stacked on the guide pin 8. FIG. 3 shows the use of ten compression pads 9 as a typical example. The number of compression pads used, however, may be varied depending on the thickness of the pads, the length of the shock absorber, and other factors. After stacking the compression pads 9 on the guide pin 8, the friction pads 16 are placed in the channel 13 with the elastomeric block 18 of each friction pad 16 facing radially inwardly. With the friction pads 16 positioned on the plunger 3, the plunger is inserted into the housing 2 with the open end of the plunger passing over the compression pads 9 and the friction shoes 17 bearing against the inside surface 19 of the housing sidewall 4. The surface 19 is inclined at such an angle that the inside diameter of the housing is smaller at the closed end than at the open end. A typical angle of inclination might be about 2° or more. Because of the inclination of the surface 19, the elastomeric block 18 of each friction pad 16 is subjected to progressively increasing compression as the plunger moves deeper into the housing and is subjected to progressively decreasing compression as the plunger moves in a return stroke toward the open end of the housing 2. After the plunger 3 has been inserted in the housing, a plurality of retaining pins 20 are inserted through the sidewall 4 of the housing near the open end thereof and project inside the housing a sufficient distance to contact the rib 14 and retain the plunger within the housing.

In FIG. 3, the plunger has been secured in the housing 2 by the retaining pins 20 with a small preload force onto the plunger. The elastomeric parts are under the least compression when the plunger is in this position. The only compression present in this position is caused by the depth at which the retaining pins 20 hold the plunger 3 in the housing 2.

Figure 4:
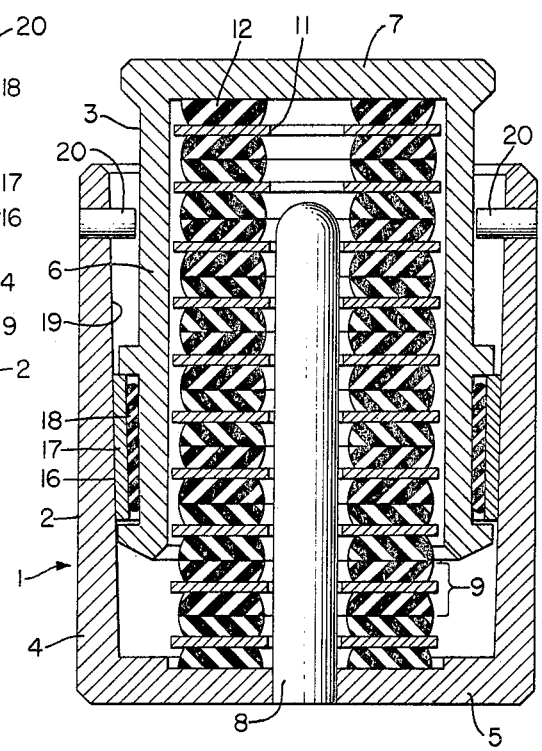
FIG. 4 shows a cross-sectional view similar to FIG. 3 with the plunger in a loaded position.

FIG. 4 shows the shock absorber 1 under a static load condition with the plunger driven approximately half way into the housing 2. In this position, the cushioning rings 12 of the compression pads 9 show an increase in radial deflection due to the axial compression exerted thereon. The elastomeric blocks 18 of the friction pads 16 are under radial compression due to the wedging action between the plunger 3 and the inclined inside surface 19 of the housing sidewall 4. As the plunger 3 moves deeper into the housing, less clearance is present between the plunger 3 and the sidewall 4 because of the inclination of the inside surface 19. As the clearance decreases, the rate of compression increases thereby increasing the drag of the friction shoes 17 on the surface 19.

Figure 5:
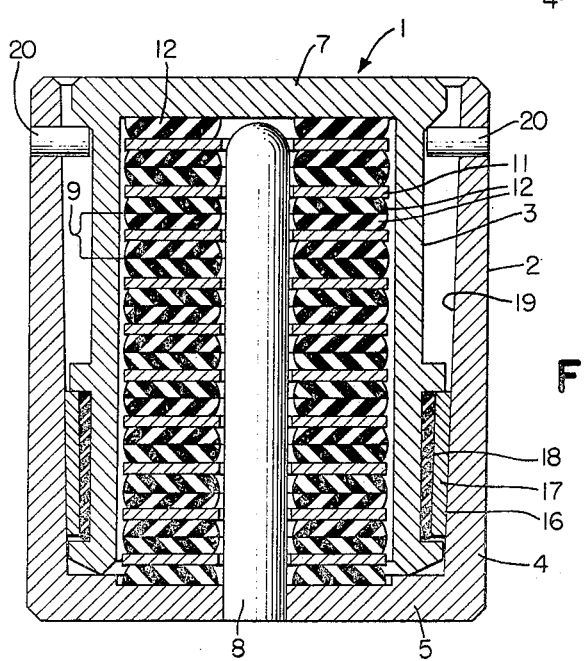
FIG. 5 is a cross-sectional view similar to FIG. 3 with the plunger in a full travel position.

FIG. 5 shows the shock absorber 1 with the plunger 3 at full travel position wherein the plunger is seated on the end wall 5 of the housing 2. In this position, all the elastomeric members are under the greatest amount of deflection and compression.

As the plunger 3 withdraws from the housing 2 on the return stroke, the inclination of the inside surface 19 of the sidewall 4 causes the pressure exerted by the friction pad 16 to drop off sharply. The reduced drag of the friction shoes 17 enables the compression pads 9 to return the plunger 3 to the unloaded position more easily than would be possible if the friction shoes 17 were contacting a straight sidewall where the pressure exerted by the shoes would remain constant during the entire stroke of the plunger. If a straight sidewall were used, the friction of the shoes 17 against the sidewall must be sufficiently low to permit the compression pads 9 to overcome the frictional force and return the plunger 3 to the withdrawn position.

Figure 10:
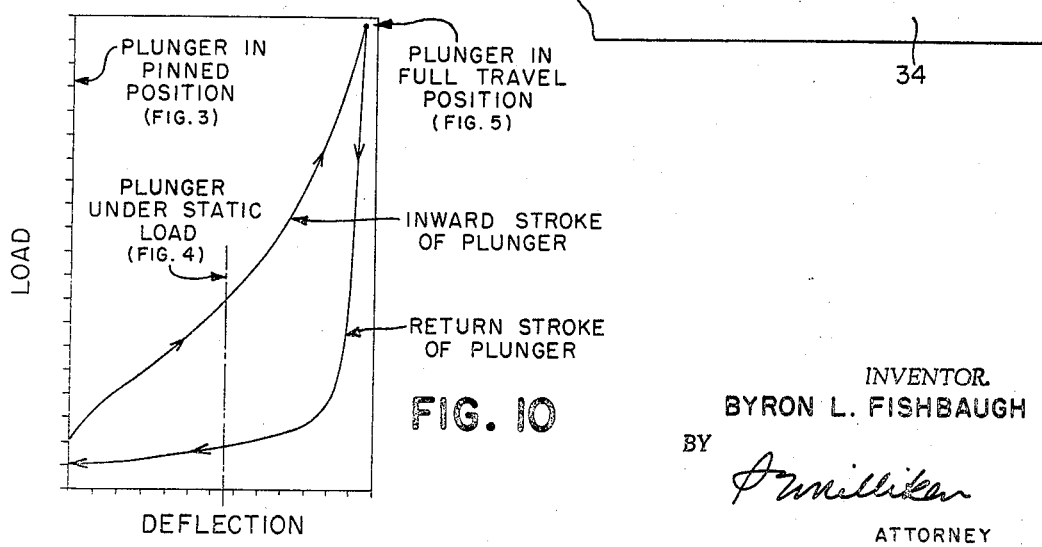
FIG. 10 is a graph showing typical load deflection curves of the apparatus of the invention.

FIG. 10 shows graphically the load and deflection pattern of the apparatus shown in FIGS. 3 through 5 and illustrates the sharp drop-off in load on the return stroke of the plunger 3.

Figure 6:
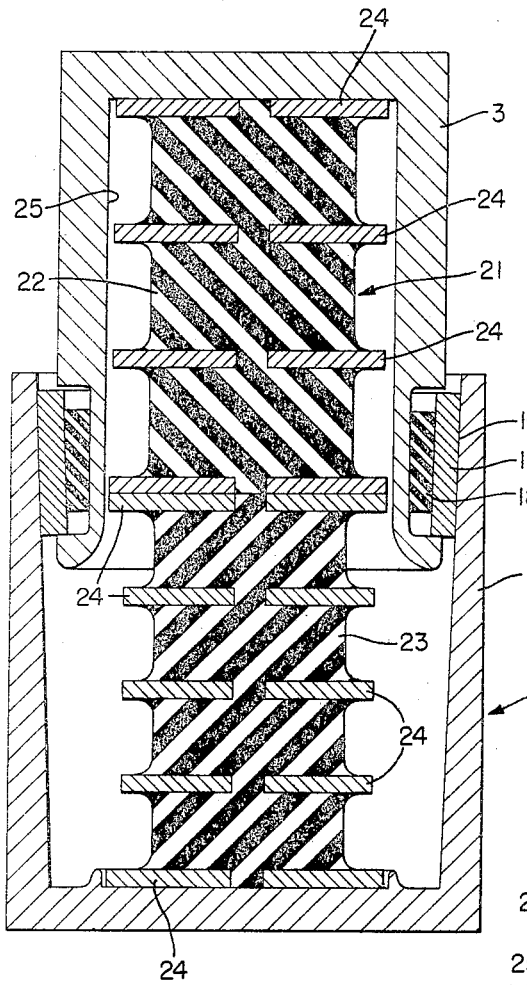
FIG. 6 is a cross-sectional view of another embodiment of the invention using a different type of compression member with the plunger in an unloaded position.
Figure 7:
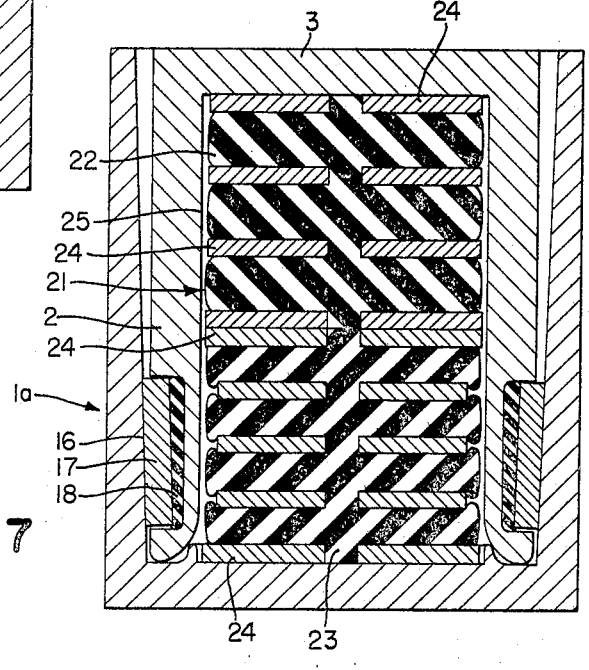
FIG. 7 is a cross-sectional view of the shock absorber shown in FIG. 6 with the plunger at full travel position.

FIGS. 6 and 7 show a shock absorber 1a which is a modification of the shock absorber 1 shown in FIGS. 1 through 5, the only difference being that the center compression column 21 in shock absorber 1a differs from that shown in the previous embodiment. Instead of using a plurality of ring-shaped compression pads 9, this embodiment uses a pair of elongated cylindrical elastomeric compression blocks 22 and 23, each of which has a plurality of stiffener plates 24 embedded therein at spaced locations throughout the length of each block. Unlike the previous embodiment, there is no center opening through the compression blocks 22 and 23 and hence there is no need for a guide pin such as guide pin 8 shown in the shock absorber 1. In FIG. 7, the plunger 3 is in full travel position with the open end of the plunger 3 seated in the bottom of the housing 2. The friction pads 16 in this embodiment operate in the same manner as those shown in FIGS. 1 through 5 and, hence will not be described in further detail.

Figure 8:
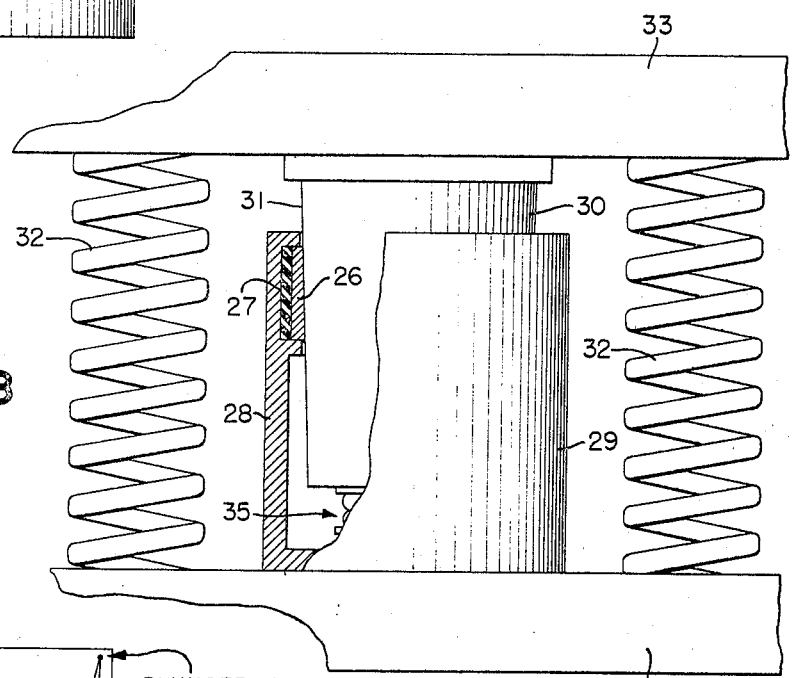
FIG. 8 is a side view of another embodiment of the invention used in combination with external springs.

Another modification of the invention is a shock absorber 1b shown in FIG. 8 wherein the friction pads 26 are mounted in a recessed channel 27 in the sidewall 28 of a housing 29. A plunger 30 has a tapered wall 31 which bears against the friction pad 26 and operates upon the same principal as the friction pads 16 sliding against the inclined surface 19 in the shock absorber 1. In addition, the configuration shown in FIG. 8 shows a pair of external coil springs 32 which tend to urge apart two structural body members 33 and 34 to which the plunger 30 and the housing 29 are respectively fastened. The embodiment shown in FIG. 8 may use a center compression column such as that described in previous embodiments or may rely solely on the external springs 32 to replace the center compression column.

Figure 9:
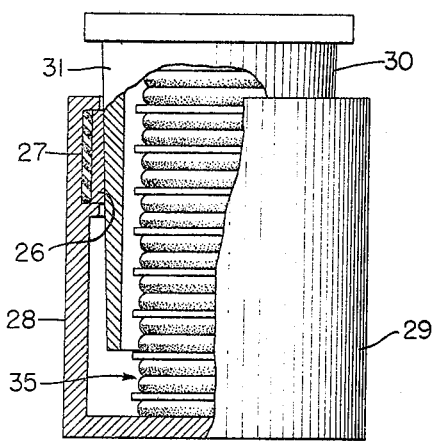
FIG. 9 is a side view of an embodiment of the invention similar to that shown in FIG. 8 with parts of the structure broken away to shown the use of internal compressions pads.

FIG. 9 shows a shock absorber 1c having a housing 29, a plunger 30, and a friction pad 26 in a channel 27 identical to the parts shown in shock absorber 1b in FIG. 8 but using a center compression column 35 instead of the external springs 32.

It may be seen that certain features of the various embodiments shown herein may be combined in numerous combinations without departing from the overall scope of the invention. So long as the friction pad bears against an inclined surface to produce a varying amount of frictional drag as the plunger moves to and fro in the housing, it does not necessarily matter whether the friction pad is held by the plunger or by the housing nor whether the inclined surface is on the wall of the plunger or the housing wall. Either arrangement will provide the desired result so long as the angle of inclination of the friction surface and the thickness and durometer of the elastomeric block used in the friction pad are properly selected to fit the particular type of shock absorber in which they are to be used.

The shock absorbers 1, 1a, 1b, or 1c may be used either by placing them between two spaced body members or by fastening the housing to one body member and the plunger to another body member.

Various changes may be made in the illustrative embodiments shown herein without departing from the scope of the invention.

What is claimed is:

1. A shock absorber comprising:
   (A) a tubular housing having a closed end and an open end,
   (B) a hollow tubular plunger telescopically received by the housing, said plunger having
      (1) an open end projecting into the housing and a closed end protruding from the open end of the housing,
   (C) cushioning means positioned centrally within the housing and the plunger (in axial alignment therewith), one end of said cushioning means bearing against the closed end of the housing and the other end of the cushioning means bearing against the closed end of the plunger, and
   (D) at least one resilient friction pad for creating frictional drag between the housing and the plunger to resist relative axial movement thereof.

2. A shock absorber as claimed in claim 1 wherein the cushioning means is a plurality of compression pads containing elastomeric blocks and stiffener plates, said compression pads being stacked inside the housing and the plunger and said pads being subjected to compression when any loading is exerted against either the housing or the plunger to cause the plunger to move into the housing.

3. A shock absorber as claimed in claim 2 wherein a center guide pin has one end fastened to the closed end of the housing and the other end of the pin is a free end extending toward the open end of the housing and wherein the compression pads have a central opening therethrough which permits them to be stacked on the guide pin in sliding relationship therewith.

4. A shock absorber as claimed in claim 3 wherein the compression pads are ring shaped and consist of a round plate having a central hole therethrough and an elastomeric ring bonded to each side of the plate with the circumferential edges of the elastomeric rings terminating short of the circumferential edges of the plate thereby providing room for radial expansion of the rings when they are under compression inside the plunger and the housing.

5. A shock absorber as claimed in claim 1 wherein a plurality of friction pads, each comprised of an elastomeric block and a friction shoe bonded thereto, are mounted around the outside of the plunger to move with the plunger in sliding contact with the inside of the housing wall.

6. A shock absorber as claimed in claim 5 wherein the friction pads are mounted in an annular recess in the outer surface of the plunger wall.

7. A shock absorber as claimed in claim 5 wherein the inner wall of the housing is tapered in such manner that the inside diameter is greater at the open end than at the closed end.

8. A shock absorber as claimed in claim 1 wherein a plurality of friction pads, each comprised of an elastomeric block and a friction shoe bonded thereto, are mounted around the inside of the housing for sliding contact with the outside of the plunger wall.

9. A shock absorber as claimed in claim 8 wherein the friction pads are mounted in an annular recess in the inner surface of housing wall.

10. A shock absorber as claimed in claim 8 wherein the outside of the plunger wall is tapered so that the outside diameter of the plunger is greatest at its closed end and decreases toward its open end.

11. A shock absorber for damping vibrator between two spaced body members having spring means therebetween urging the body members apart comprising:
    (A) a friction pad support member extending from one body member toward the opposite body member,
    (B) a wall having an inclined friction surface extending from the opposite body member toward the body member carrying the support member,
    (C) at least one resilient friction pad mounted on the support member and carrying a friction shoe for sliding contact with the inclined friction surface when the body members are moved either toward or away from each other to resist the relative movement of the body members, and
    (D) the inclined friction surface being at such an angle that the friction pad offers the greatest resistance when the body members are closest together and the least resistance when the body members are farthest apart.

12. A shock absorber as claimed in claim 11 wherein the friction pad support member is a tubular member and the wall having the inclined friction surface is formed by another tubular member both tubular members being assembled together in telescoping relationship and the friction pad positioned between the tubular members, said friction pad being under varying rates of compression depending upon the relative axial positions of the tubular members to each other.

13. A shock absorber comprising:
    (A) a tubular housing having a closed end and an open end,
    (B) a plunger telescopically received by the housing, said plunger being movable axially inwardly and outwardly within the housing,
    (C) a first resilient means positioned within the housing to resist inward movement of the plunger, one end of said first resilient means bearing against the closed end of the housing and the other end bearing against the plunger, and
    (D) a second resilient means mounted on said plunger for exerting radially outward pressure against an inner wall surface of the housing to resist axial movement of the plunger with respect to the housing.

References Cited

UNITED STATES PATENTS

| 2,641,463 | 6/1953 | Mulcahy | 267—63 |
| 2,733,915 | 2/1956 | Dentler | 263—63 |

JAMES B. MARBERT, Primary Examiner

U.S. Cl. X.R.

267—9, 63